(12) United States Patent
Takeuchi et al.

(10) Patent No.: US 10,101,066 B2
(45) Date of Patent: Oct. 16, 2018

(54) ADSORBER AND ADSORPTION REFRIGERATOR

(71) Applicant: DENSO CORPORATION, Kariya, Aichi-pref. (JP)

(72) Inventors: Shinsuke Takeuchi, Kariya (JP); Akira Yanagida, Kariya (JP); Yoshiyuki Okamoto, Kariya (JP); Hisao Nagashima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 147 days.

(21) Appl. No.: 15/104,948

(22) PCT Filed: Dec. 17, 2014

(86) PCT No.: PCT/JP2014/006293
§ 371 (c)(1),
(2) Date: Jun. 15, 2016

(87) PCT Pub. No.: WO2015/093051
PCT Pub. Date: Jun. 25, 2015

(65) Prior Publication Data
US 2016/0313034 A1    Oct. 27, 2016

(30) Foreign Application Priority Data

Dec. 18, 2013    (JP) ................................. 2013-261004

(51) Int. Cl.
*F25B 37/00*    (2006.01)
*F25B 17/08*    (2006.01)
(Continued)

(52) U.S. Cl.
CPC ............ *F25B 37/00* (2013.01); *F25B 17/083* (2013.01); *F25B 41/046* (2013.01);
(Continued)

(58) Field of Classification Search
CPC ...... F25B 17/083; F25B 37/00; F25B 41/046; F25B 49/046; F25B 2500/01;
(Continued)

(56) References Cited

U.S. PATENT DOCUMENTS

2004/0089001 A1    5/2004 Kakiuchi et al.
2004/0093876 A1    5/2004 Inagaki et al.
(Continued)

FOREIGN PATENT DOCUMENTS

CN    1904512 A    1/2007
JP    H04148194 A    5/1992
(Continued)

*Primary Examiner* — Marc Norman
(74) *Attorney, Agent, or Firm* — Harness, Dickey & Pierce, P.L.C.

(57) ABSTRACT

An adsorber includes: a heat-medium pipe through which a heat medium flows; an adsorbent layer having an adsorbent that adsorbs a vapor-phase refrigerant located outside the heat-medium pipe by being cooled by the heat medium, and further desorbs the adsorbed refrigerant by being heated; and a heat-transfer member that transfers heat between the heat-medium pipe and the adsorbent. In the adsorber in which the heat-transfer member and the adsorbent are integrally formed, an adsorbent filling ratio $\phi$ is set at 70% or less when the adsorbent filling ratio $\phi$ is defined as a value obtained by dividing a filling density $\rho$ of the adsorbent filled in the adsorbent layer by a true density $\rho_{abs}$ of particles of the adsorbent. For example, the adsorber may be suitably used for an adsorption refrigerator.

15 Claims, 9 Drawing Sheets

(51) Int. Cl.
   *F28F 13/00*   (2006.01)
   *F28D 20/00*   (2006.01)
   *F28F 1/24*    (2006.01)
   *F25B 41/04*   (2006.01)
   *F28D 7/16*    (2006.01)
   *F25B 49/04*   (2006.01)

(52) U.S. Cl.
   CPC ......... *F28D 7/1676* (2013.01); *F28D 20/003* (2013.01); *F28F 1/24* (2013.01); *F28F 13/003* (2013.01); *F25B 49/046* (2013.01); *F25B 2500/01* (2013.01); *F25B 2500/23* (2013.01); *F25B 2600/01* (2013.01); *F28F 2255/18* (2013.01); *Y02A 30/277* (2018.01); *Y02A 30/278* (2018.01); *Y02B 30/62* (2013.01); *Y02B 30/64* (2013.01); *Y02E 60/142* (2013.01)

(58) Field of Classification Search
   CPC .. F25B 2500/23; F25D 20/003; F28F 13/003; F28F 2255/18; F28D 7/1676; Y02B 30/62; Y02B 30/64
   See application file for complete search history.

(56) References Cited

U.S. PATENT DOCUMENTS

| | | |
|---|---|---|
| 2008/0078532 A1 | 4/2008 | Nagashima et al. |
| 2009/0025403 A1 | 1/2009 | Kakiuchi et al. |
| 2010/0294130 A1* | 11/2010 | Haruna ............... B01D 53/047 |
| | | 95/96 |
| 2013/0091879 A1 | 4/2013 | Kakiuchi et al. |
| 2014/0047853 A1* | 2/2014 | Zhong ................. B60H 1/3201 |
| | | 62/106 |

FOREIGN PATENT DOCUMENTS

| | | |
|---|---|---|
| JP | H10185353 A | 7/1998 |
| JP | H11287531 A | 10/1999 |
| JP | 2004132690 A | 4/2004 |
| JP | 2005257199 A | 9/2005 |
| JP | 2006284051 A | 10/2006 |
| JP | 2008107075 A | 5/2008 |
| WO | WO-2013001390 A1 | 1/2013 |

* cited by examiner

ADSORBER AND ADSORPTION REFRIGERATOR

CROSS REFERENCE TO RELATED APPLICATIONS

This application is a U.S. National Phase Application under 35 U.S.C. 371 of International Application No. PCT/JP2014/006293 filed on Dec. 17, 2014 and published in Japanese as WO 2015/093051 A1 on Jun. 25, 2015. This application is based on and claims the benefit of priority from Japanese Patent Application No. 2013-261004 filed on Dec. 18, 2013. The entire disclosures of all of the above applications are incorporated herein by reference.

FIELD OF THE INVENTION

The present disclosure relates to an adsorber having an adsorbent that adsorbs and desorbs a fluid, and an adsorption refrigerator including the adsorber.

BACKGROUND ART

In the related art, there is disclosed an adsorber for use in an adsorption refrigerator that includes an adsorbent layer provided at an outer periphery of a heat-medium pipe for the flow of a heat medium and containing a mixture of an adsorbent and a heat-transfer member (see, e.g., Patent Document 1).

RELATED ART DOCUMENT

Patent Document

Patent Document 1: Japanese Unexamined Patent Application Publication No. Hei 04-148194

SUMMARY OF THE INVENTION

In the adsorber described in the above-mentioned Patent Document 1, an adsorption capacity Q (adsorbability) is represented by formula 1 below.

$$Q = G \cdot \Delta H \cdot \Delta C \cdot \eta \sqrt{\tau} \quad \text{(Formula 1)}$$

where G is an adsorbent amount, $\Delta H$ is a latent heat of a refrigerant adsorbed and desorbed by the adsorbent, $\Delta C$ is an adsorption capacity, $\eta$ is an adsorption efficiency, and $\tau$ is a switching time. The term "switching time $\tau$" as used herein means a time that takes to switch between an adsorption operation of adsorbing the refrigerant in the adsorbent and a desorption operation of desorbing the adsorbed refrigerant from the adsorbent.

As can be seen from formula 1, as the adsorbent amount G increases, its adsorption capacity Q is improved. However, when the rate of the adsorbent amount in the adsorbent layer is increased, the adsorption efficiency $\eta$ is reduced more than the increase in the rate of the adsorbent amount G because the adsorbent has high thermal resistance, resulting in degradation in the adsorption capacity Q.

The present disclosure has been made in view of the foregoing matter, and it is an object of the present disclosure to provide an adsorber and an adsorption refrigerator that can improve the adsorption capacity.

According to an aspect of the present disclosure, an adsorber includes a heat-medium pipe through which a heat medium flows, an adsorbent layer including an adsorbent that adsorbs a vapor-phase refrigerant located outside the heat-medium pipe by being cooled by the heat medium and desorbs the adsorbed refrigerant by being heated, and a heat-transfer member that transfers heat between the heat-medium pipe and the adsorbent, the heat-transfer member and the adsorbent being integrally formed. In the adsorber, an adsorbent filling ratio $\phi$ is 70% or less when the adsorbent filling ratio $\phi$ is defined as a value obtained by dividing a filling density $\rho$ of the adsorbent filled in the adsorbent layer by a true density $\rho_{abs}$ of particles of the adsorbent.

Thus, the adsorbent filling ratio $\phi$ is set at 70% or less to enable enhancing the adsorption efficiency, thereby improving the adsorption capacity.

Note that the expression "the heat-transfer member and the adsorbent are integrally formed" as used in the present disclosure means that the adsorbent is three-dimensionally disposed with respect to the heat-transfer member. For example, when the heat-medium pipe is configured of a circular pipe, and a plurality of plate-shaped heat-transfer members is provided at the outer surface of the heat-medium pipe, the expression "the heat-transfer member and the adsorbent are integrally formed" means that the adsorbent is three-dimensionally disposed not only in the longitudinal direction of the heat-transfer member (in the radius direction of the heat-medium pipe) with respect to the heat-transfer member, but also in the longitudinal direction (axis direction) of the heat-medium pipe as well as in the peripheral direction of the heat-medium pipe.

DESCRIPTION OF THE EMBODIMENTS

In the following, embodiments of the present disclosure will be described with reference to the accompanying drawings. Note that in the embodiments below, the same or equivalent parts are indicated by the same reference characters throughout the figures.

First Embodiment

Figure 1:
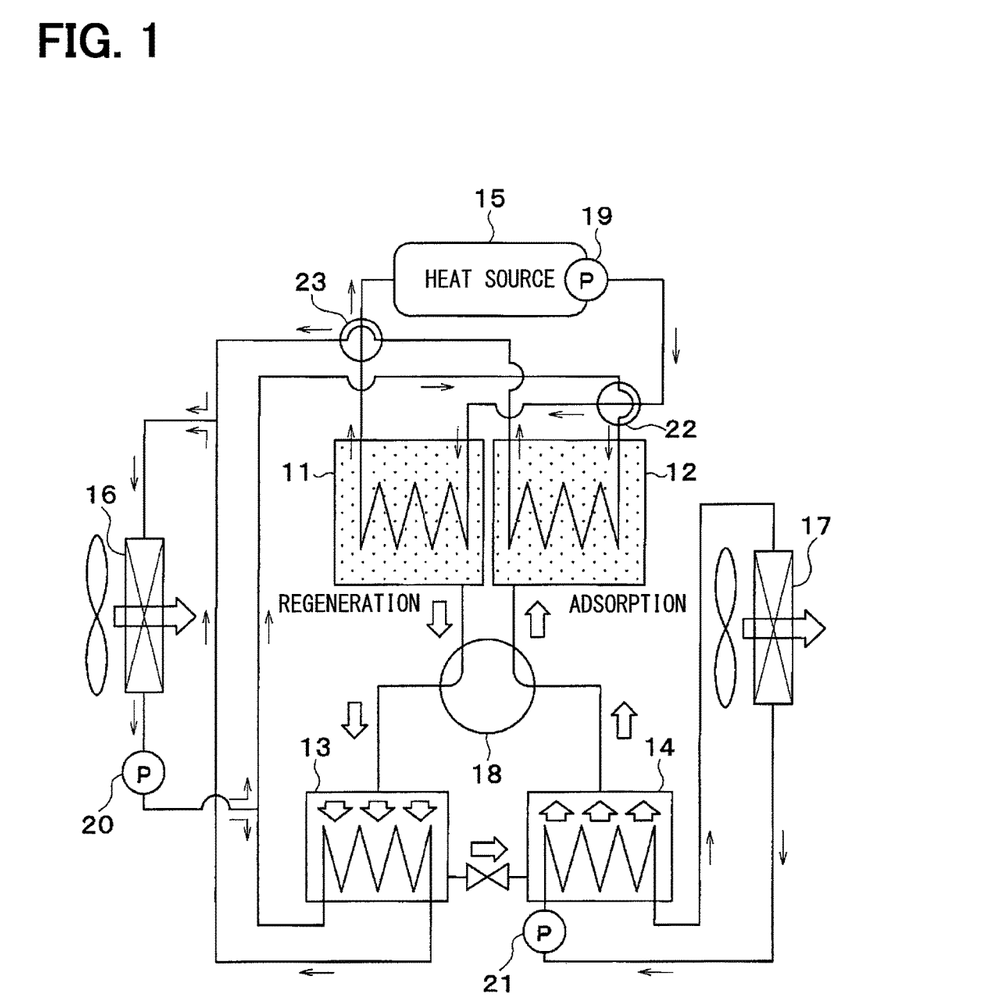
FIG. 1 is an entire configuration diagram of an adsorption refrigerator according to a first embodiment, while showing a first operating state.

A first embodiment of the present disclosure will be described based on FIGS. 1 to 6. As shown in FIG. 1, an adsorption refrigerator includes two adsorbers, namely, first and second adsorbers 11 and 12, a condenser 13, and an evaporator 14.

A first heat medium (water in the present embodiment) circulates through the insides of the first and second adsorbers 11 and 12. An adsorbent for adsorbing and desorbing a refrigerant is retained at the surfaces of the first and second adsorbers 11 and 12.

The first heat medium circulating through the insides of the first and second adsorbers 11 and 12 can be switched between a high-temperature heat medium heated by a heat source 15 and a low-temperature heat medium cooled by an exterior unit 16. The exterior unit 16 is a heat-dissipation heat exchanger that cools the first heat medium by exchanging heat between the heat medium and the exterior air.

When the low-temperature heat medium circulates through the insides of the first and second adsorbers 11 and 12, the adsorbent adsorbs the vapor refrigerant. When the high-temperature heat medium circulates through the insides of the first and second adsorbers 11 and 12, the adsorbent desorbs the refrigerant. For example, zeolite, silica gel, and the like can be used as the adsorbent.

The condenser 13 condenses a vapor refrigerant (water vapor in the present embodiment) desorbed by one of the first and second adsorbers 11 and 12 by exchanging heat between the vapor refrigerant and the first heat medium cooled by the exterior unit 16.

The evaporator 14 evaporates a liquid refrigerant (water in the present embodiment) flowing thereinto from and condensed by the condenser 13 by exchanging heat between the liquid refrigerant and the second heat medium (water in the present embodiment) from an interior unit 17. The vapor refrigerant evaporated by the evaporator 14 is adsorbed by one of the first and second adsorbers 11 and 12. The interior unit 17 is a cooling heat exchanger that cools the interior air by exchanging heat between the second heat medium having its heat absorbed by the evaporator 14 and the interior air.

The circulation of the vapor refrigerant among the first and second adsorbers 11 and 12, the condenser 13, and the evaporator 14 is controlled by an evaporator valve 18.

Referring to FIG. 1, pumps 19 and 20 allow for the circulation of the first heat medium, and a pump 21 allows for the circulation of the second heat medium. Switching valves 22 and 23 switch a circulation route for the first heat medium.

Next, the structures of the first and second adsorbers 11 and 12 in the present embodiment will be described. Since the first adsorber 11 and the second adsorber 12 have the same structure, hereinafter, the first adsorber 11 will be described, and the description of the second adsorber 12 will be omitted.

Figure 2:
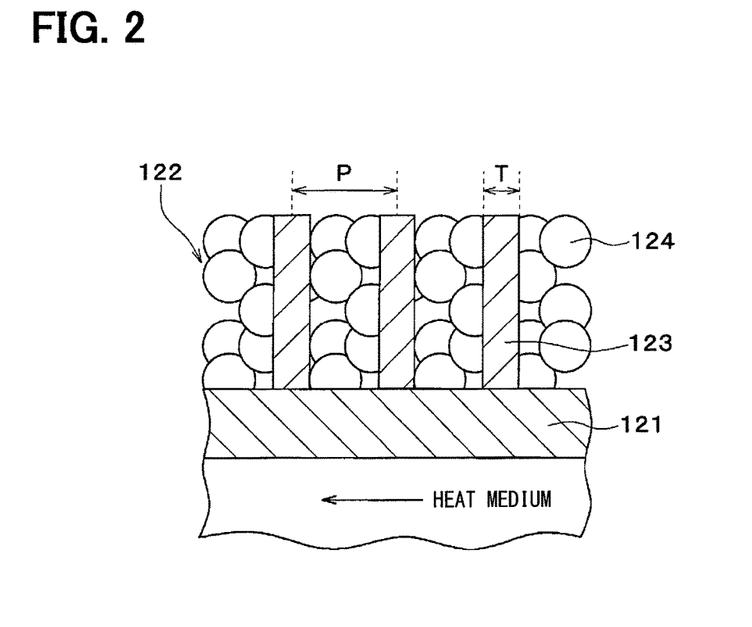
FIG. 2 is an enlarged view showing a first adsorber in the first embodiment.

As shown in FIG. 2, the first adsorber 11 has a heat-medium pipe 121 through which the heat medium flows. The heat-medium pipe 121 is made of metal with excellent thermal conductivity (in the present embodiment, copper or a copper alloy). An adsorbent layer 122 is provided on the outer side of the heat-medium pipe 121.

Specifically, heat-transfer members 123, which are made of metal with excellent thermal conductivity (in the present embodiment, copper or a copper alloy), are metal-bonded to the outer surface of the heat-medium pipe 121. Each heat-transfer member 123 of the present embodiment is formed in a plate shape. A plurality of the heat-transfer members 123 are arranged at equal intervals with a predetermined pitch P. The arrangement direction of the plurality of heat-transfer members 123 is in parallel with the flow direction of the heat medium through the heat-medium pipe 121.

An adsorbent 124 is filled between the adjacent heat-transfer members 123. Thus, the heat-transfer members 123 and the adsorbent 124 are integrally formed. The adsorbent 124 adsorbs the vapor-phase refrigerant (water vapor) present outside the heat-medium pipe 121 by being cooled by the heat medium, and further desorbs the adsorbed refrigerant (water vapor) by being heated. The adsorbent 124 is made up of a number of fine particles, for example, of silica gel or zeolite. Such heat-transfer members 123 and adsorbent 124 form the adsorbent layer 122.

Next, the operation of the above-mentioned structure will be described. The adsorption refrigerator is configured to switch between one adsorber executing an adsorbing step (adsorbing operation) of adsorbing the refrigerant into the adsorbent 124 and the other adsorber executing a desorbing step (desorbing operation) of desorbing the adsorbed refrigerant from the adsorbent 124, in the first and second adsorbers 11 and 12.

Specifically, the switching valves 22 and 23 are first operated as shown in FIG. 1, thereby allowing the high-temperature first heat medium to circulate between the heat source 15 and the first adsorber 11, and allowing the low-temperature first heat medium to circulate between the exterior unit 16 and each of the second adsorber 12 and condenser 13.

In this way, the first adsorber 11 executes the desorbing operation to desorb the adsorbed refrigerant, while the second adsorber 12 executes the adsorbing operation to adsorb the vapor refrigerant, whereby the first adsorber 11 regenerates the adsorbent, and the air to be blown into the interior is cooled with a refrigeration capacity exhibited by the second adsorber 12.

Figure 3:
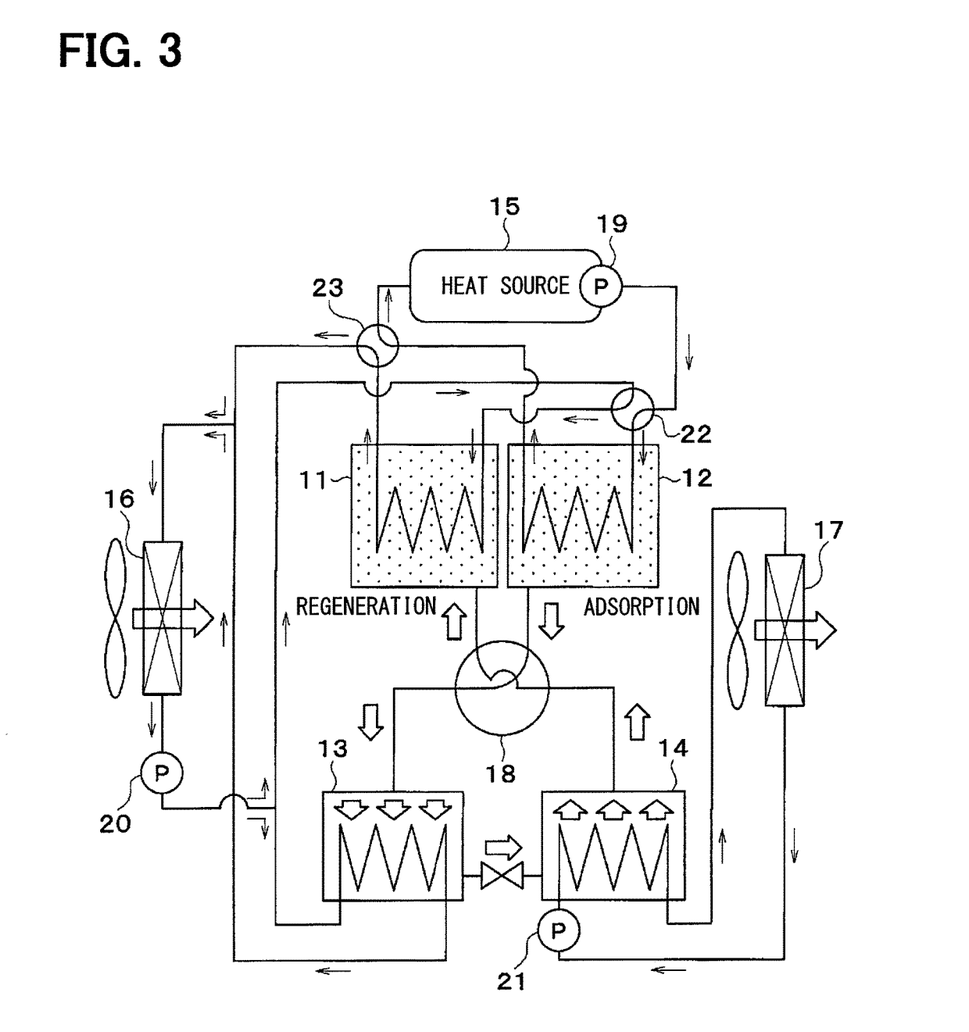
FIG. 3 is an entire configuration diagram of the adsorption refrigerator according to the first embodiment, while showing a second operating state.

When a predetermined time has elapsed in this state (the first operating state), the switching valves 22 and 23 are operated as shown in FIG. 3, thereby allowing the high-temperature first heat medium to circulate between the heat source 15 and the second adsorber 12, and allowing the low-temperature first heat medium to circulate between the exterior unit 16 and each of the first adsorber 11 and condenser 13.

In this way, the first adsorber 11 executes the adsorbing operation, while the second adsorber 12 executes the desorbing operation, whereby the air-conditioned air is cooled with the refrigeration capacity exhibited by the first adsorber 11, and the adsorbent is regenerated by the second adsorber 12.

When a predetermined time has elapsed in this state (the second operating state), the switching valves 22 and 23 are operated to bring the adsorption refrigerator again into the state as shown in FIG. 1 (first operating state). In this way, the first operating state shown in FIG. 1 and the second operating state shown in FIG. 3 are alternately repeated at the predetermined time intervals, thereby continuously operating the adsorption refrigerator.

The predetermined time is selected as appropriate based on the amount of remaining liquid refrigerant in a casing 24, the adsorption abilities of the adsorbents in the first and second adsorbers 12, and the like. The predetermined time is hereinafter referred to as a switching time T. In the present embodiment, in each of the first and second adsorbers 11 and 12, an adsorption-step time, which is a time required to adsorb the refrigerant into the adsorbent 124, is equal to a desorption-operation time, which is a time required to desorb the adsorbed refrigerant from the adsorbent 124.

As mentioned above, the adsorption capacity Q in each of the first and second adsorbers 11 and 12 is represented by formula 1 below.

$$Q = G \cdot \Delta H \cdot \Delta C \cdot \eta / \tau \qquad \text{(Formula 1)}$$

At this time, the product of the adsorption capacity $\Delta C$ and the adsorption efficiency $\eta$ is represented by the function of an adsorbent temperature Tad and a refrigerant temperature Tv as shown in formula 2 below.

$$\Delta C \cdot \eta \propto f(Tad, Tv) \qquad \text{[Formula 2]}$$

where Tad is the adsorbent temperature, and Tv is the refrigerant temperature.

Here, the adsorbent temperature Tad is determined by heat-transfer calculation using a thermal resistance from the heat medium up to the adsorbent 124. When using a common adsorbent, such as silica gel or zeolite, as the adsorbent 124, a thermal conductivity of the adsorbent 124 is of the order of 0.01 to 0.1 W/mK. In contrast, a thermal conductivity of the heat-transfer member 123 formed of copper, aluminum, etc., is of the order of several hundreds of W/mK. Thus, the thermal resistance of the adsorbent 124 is very high, compared to the heat-transfer member 123.

Thus, a filling ratio $\phi$ of the adsorbent 124 affects the adsorbent temperature more than the materials of the adsorbent 124 and the heat-transfer member 123 do, and the adsorption capacity $\eta$ is limited by such a filling ratio $\phi$ of the adsorbent 124.

The filling ratio of the adsorbent 124 is represented by formula 3 below.

$$\phi \equiv \frac{\rho}{\rho \text{abs}} \qquad \text{[Equation 3]}$$

Here, $\rho$ is a filling density of the adsorbent 124 filled in the adsorbent layer 122, and $\rho$abs is a true density of particles of the adsorbent 124. The filling density $\rho$ of the adsorbent 124 is represented by formula 4 below.

$$\rho = m/V \qquad \text{(Formula 4)}$$

where m is a weight of the adsorbent 124 filled into the adsorbent layer 122, and V is the total volume of the adsorbent layer 122.

Figure 4:
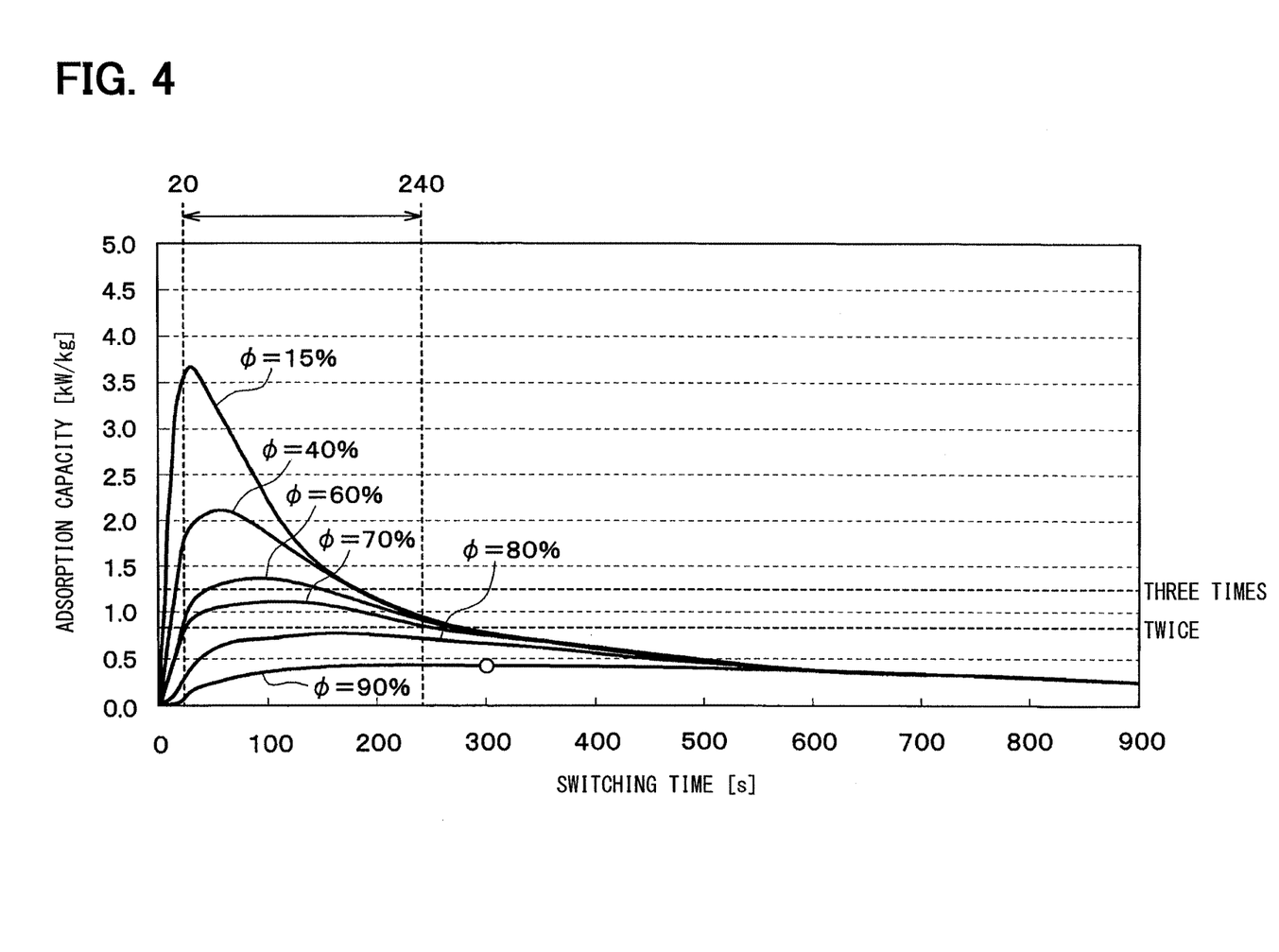
FIG. 4 is a characteristic diagram showing the relationship between a switching time and an adsorption capacity.
Figure 5:
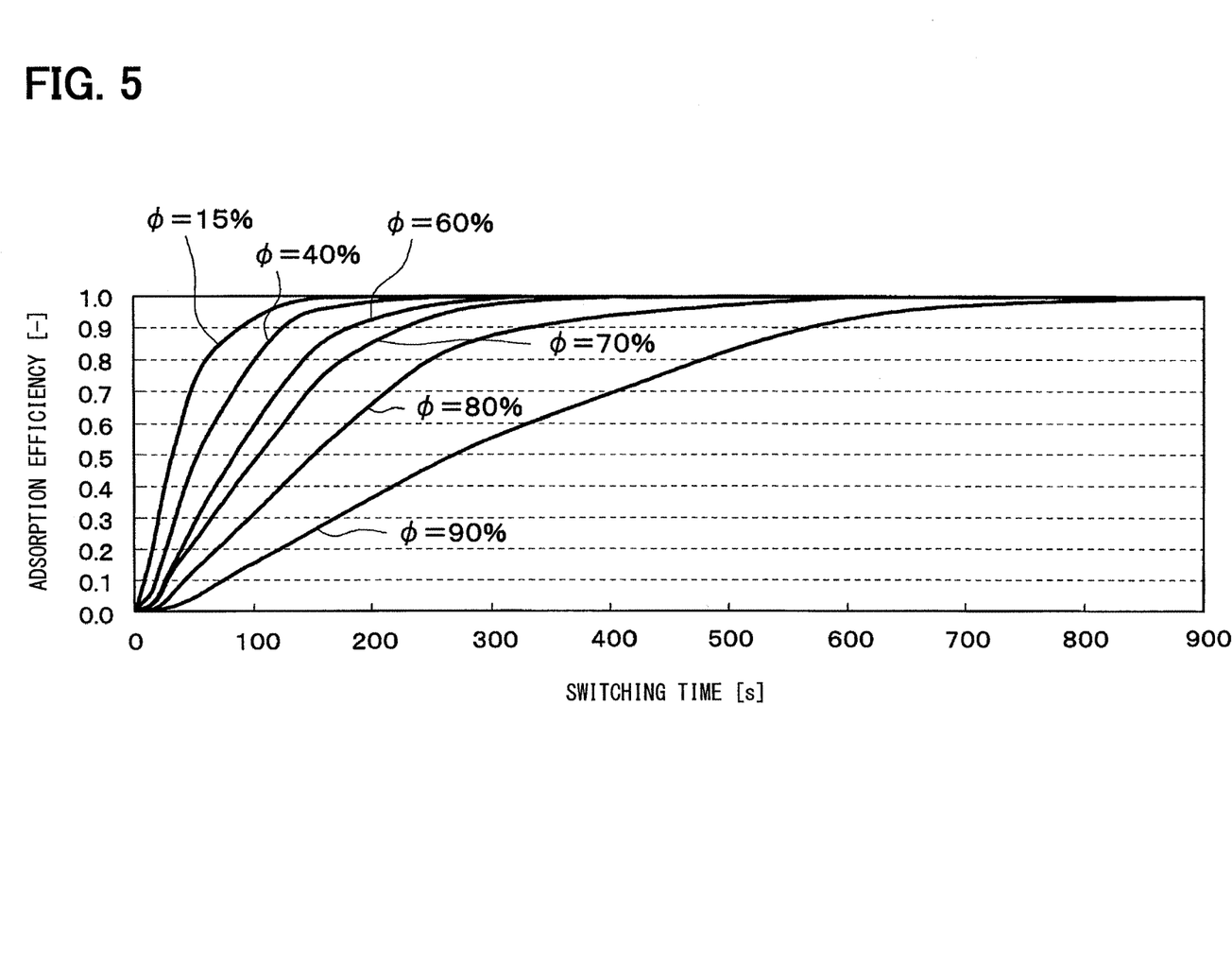
FIG. 5 is a characteristic diagram showing the relationship between a switching time and an adsorption efficiency.

Here, in the adsorbers 11 and 12 using zeolite as the adsorbent 124 and including the heat-transfer members 123 made of copper, FIG. 4 shows the changes in the adsorption capacity depending on the filling ratio $\phi$ of the adsorbent 124, and FIG. 5 shows the changes in the adsorption efficiency depending on the filling ratio $\phi$ of the adsorbent 124. As shown in Table 1 below, the filling ratio of the adsorbent 124 can be regulated by changing the thickness T and pitch P of the heat-transfer members 123.

TABLE 1

| ADSORBENT FILLING RATIO (%) | THICKNESS (μm) OF HEAT-TRANSFER MEMBER | PITCH (μm) OF HEAT-TRANSFER MEMBER |
| --- | --- | --- |
| 90 | 60 | 600 |
| 80 | 60 | 300 |
| 70 | 60 | 200 |
| 60 | 60 | 150 |
| 40 | 60 | 100 |
| 15 | 60 | 70 |

Note that the upper limit of the filling ratio $\phi$ of the adsorbent 124 is determined by the limitations on manufacturing of the heat-transfer members 123. When manufacturing the heat-transfer member 123 by common machining, the upper limit of the filling ratio is 90%.

As can be seen from FIGS. 4 and 5, as the filling ratio $\phi$ of the adsorbent 124 is decreased, the adsorption capacity becomes higher, and the adsorption efficiency also becomes higher.

The tendency that the adsorption capacity become higher as the filling ratio $\phi$ of the adsorbent 124 is decreased appears remarkable at the switching time $\tau$ ranging from 20 seconds to 240 seconds as shown in FIG. 4. Specifically, by setting the filling ratio $\phi$ of the adsorbent 124 to 70% or less, the adsorber can ensure the adsorption capacity that is twice or more as large as the maximum adsorption capacity (see a white circle in FIG. 4) in a conventional adsorber (at 90% of the filling ratio $\phi$ of the adsorbent 124). Further, by setting the filling ratio $\phi$ of the adsorbent 124 to 60% or less, the adsorber can ensure the adsorption capacity that is three times or more as large as the maximum adsorption capacity in the conventional adsorber.

Figure 6:
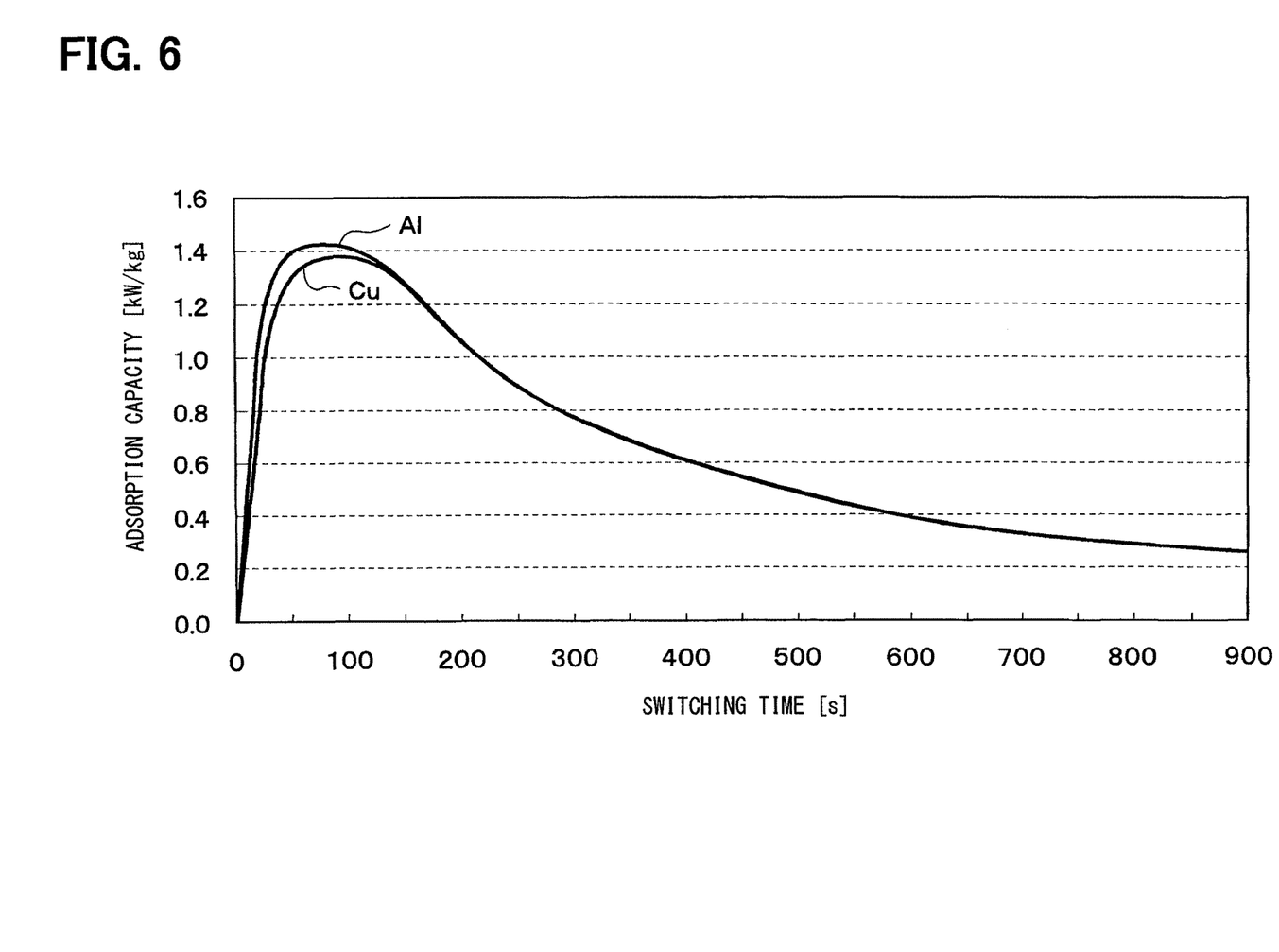
FIG. 6 is a characteristic diagram showing changes in the adsorption capacity when changing a constituent material of a heat-transfer member.

FIG. 6 shows the changes in adsorption capacity when changing the constituent material of the heat-transfer member 123 in the above-mentioned adsorbers 11 and 12. Specifically, FIG. 6 shows the change in the adsorption capacity in the use of copper as the constituent material for the heat-transfer member 123 and the change in the adsorption capacity in the use of aluminum as the constituent material for the heat-transfer member 123 when setting the filling ratio $\phi$ of the adsorbent 124 to 60%.

As can be seen from FIG. 6, the adsorption capacity hardly changes relative to the switching time $\tau$ whether the constituent material for the heat-transfer member 123 is copper or aluminum. Therefore, the tendency in which the adsorption capacity becomes higher with decreasing filling ratio $\phi$ of the adsorbent 124 does not change even though the constituent material for the heat-transfer member 123 is changed.

As explained above, the adsorbent filling ratio $\phi$ is set to 70% or less, thereby surely making the adsorption capacity twice higher than that in a conventional adsorber having about 90% of adsorbent filling ratio $\phi$. Thus, the adsorption capacity can be improved. Further, the adsorbent filling ratio $\phi$ is set to 60% or less, thereby surely making the adsorption capacity three times higher than that in a conventional adsorber described above. Thus, the adsorption capacity can be further improved. As shown in FIG. 4, the adsorbent filling ratio $\phi$ may be set, for example, in a range of 15 to 70%. In this case, the adsorption capacity can be improved while suppressing the frequent switching.

At this time, it is considered that when decreasing the adsorbent filling ratio $\phi$, the adsorbent amount G is decreased, and the adsorption capacity Q is reduced by the decrease in adsorbent amount G as can be seen from the above-mentioned formula 1. However, since the adsorption efficiency $\eta$ increases more than the decrease in adsorbent amount G, the adsorption capacity Q is improved as a result.

That is, the present embodiment can improve the adsorption capacity even though the adsorbent filling ratio $\phi$ is reduced, that is, even though the adsorbent amount is decreased. Thus, the adsorbers 11 and 12 can be downsized while improving the adsorption capacity. By downsizing the adsorbers 11 and 12, the thermal capacity of each of the adsorbers 11 and 12 is decreased, thereby making it possible for the entire refrigeration cycle of the adsorption refrigerator to exhibit a high coefficient of performance (COP).

Second Embodiment

Next, a second embodiment of the present disclosure will be described with reference to FIGS. 7 to 9. The second embodiment differs from the first embodiment by comparison in the structures of the first adsorber 11 and the second adsorber 12. Also in the present embodiment, since the first adsorber 11 and the second adsorber 12 have the same structure, hereinafter, the first adsorber 11 will be described, and the description of the second adsorber 12 will be omitted.

Figure 7:
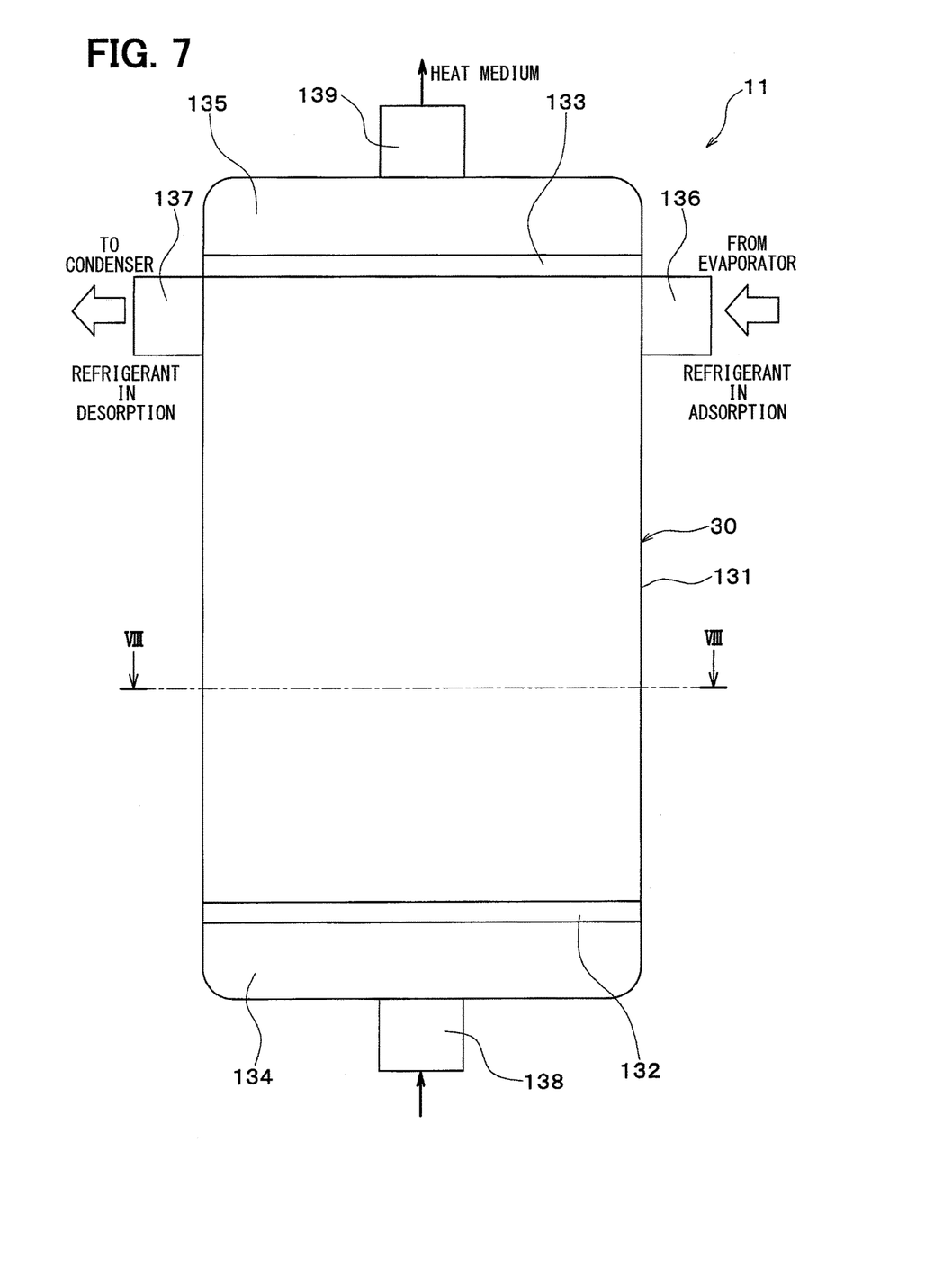
FIG. 7 is a front view showing a first adsorber according to a second embodiment.
Figure 8:
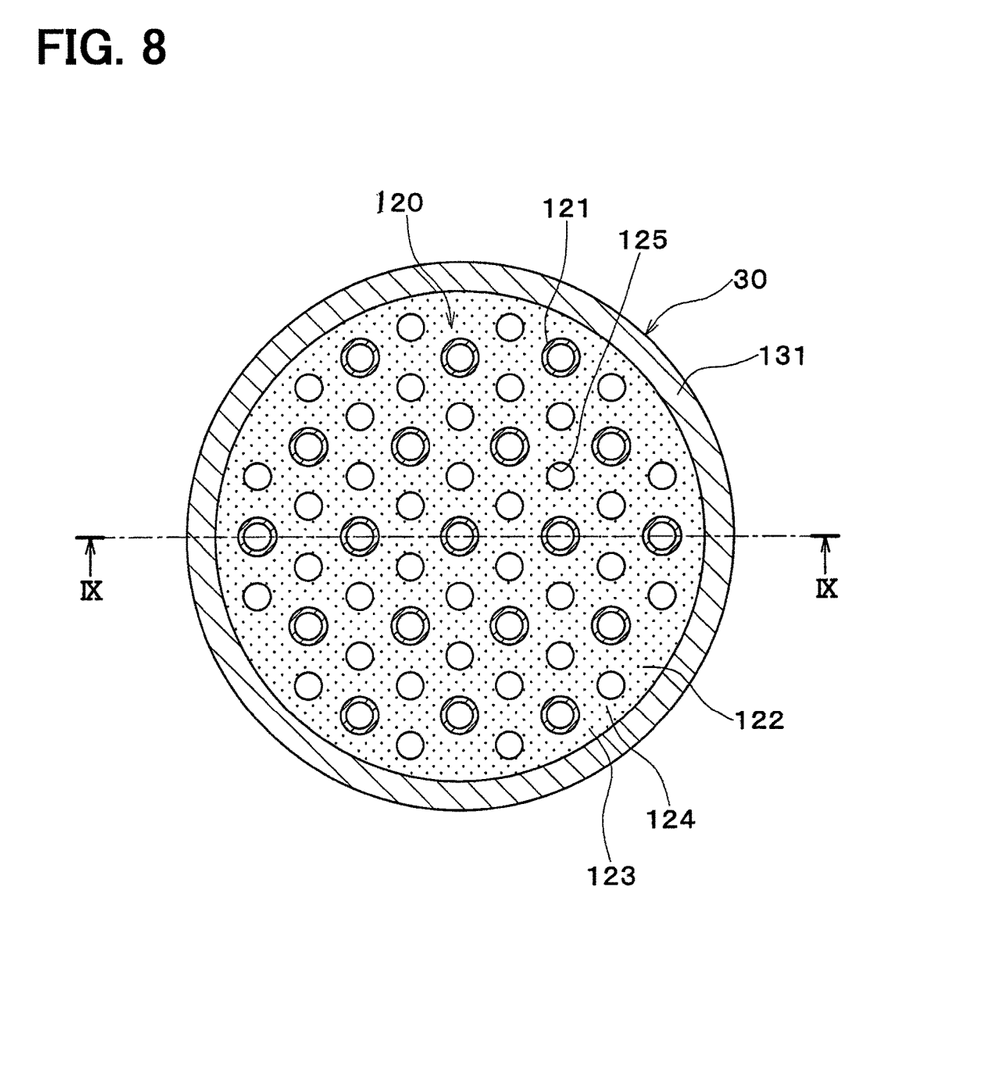
FIG. 8 is a cross-sectional view taken along the line VIII-VIII of FIG. 7.
Figure 9:
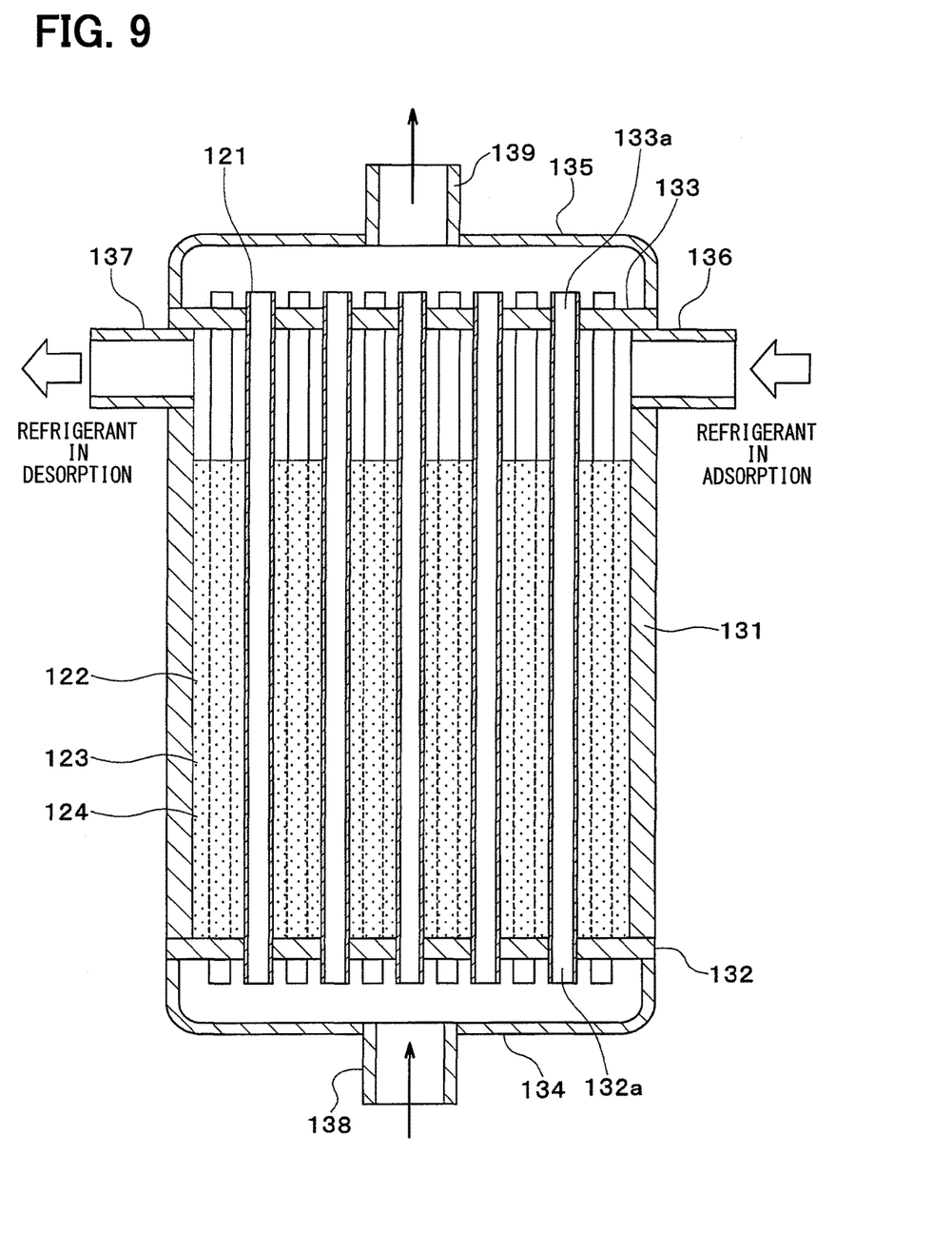
FIG. 9 is a cross-sectional view taken along the line IX-IX of FIG. 8.

As shown in FIGS. 7, 8, and 9, the first adsorber 11 of the present embodiment includes an adsorption core 120 integrally formed with and disposed in a metal case 30. The adsorption core 120 includes heat-medium pipes 121. The heat-transfer member 123 with fine pores and the adsorbent 124 are provided at the periphery of each heat-medium pipe 121. That is, the adsorption core 120 includes the heat-medium pipes 121, the heat-transfer member 123 having fine pores, and the adsorbent 124 filled into the fine pores.

The heat-transfer member 123 is a sintered body obtained by sintering and bonding metal powder with excellent thermal conductivity by not melting but heating. The metal powder for use may be copper or a copper alloy. For example, the metal powder may be formed of any form, such as powder, particles, scales, or fiber (in the present embodiment, fiber).

When sintering as described above, the sintered body has the so-called 3-D netlike pores formed therein by voids between the metal particles. The 3-D netlike pores correspond to the above-mentioned fine pores. The fine pore is a fine hole capable of filling thereinto the adsorbent 124 with a fine crystal grain size. The metal powder, that is, the heat-transfer member 123 is metal-bonded (coupled) to the heat-medium pipes 121 by sintering. The heat-transfer member 123 is formed at the periphery of a plurality of cylindrical heat-medium pipes 121 in such a manner as to entirely extend along one direction, and configures the cylindrical shape as the entire shape.

In the present embodiment, as shown in FIG. 8, refrigerant passages 125 through which the refrigerant circulates are disposed between the heat-medium pipes 121. Unlike the above-mentioned 3-D netlike fine pores, the refrigerant passages 125 are formed to extend, for example, straightly in one direction. Specifically, the refrigerant passages 125 are formed to extend in the extending direction of the heat-medium pipe 121, that is, in the axial direction of the cylindrical heat-medium pipe 121.

As shown in FIGS. 7 and 9, the case 30 includes a case main body 131, sheets 132 and 133, and tanks 134 and 135.

The case main body 131 is formed cylindrically to be capable of accommodating therein the heat-transfer member 123 of the cylindrical adsorption core 120. The upper end side opening and lower end side opening of the case main body 131 can be formed to be sealed with the sheets 132 and 133. A refrigerant inflow pipe 136 and a refrigerant outflow pipe 137 are provided above the case main body 131 to be capable of guiding the refrigerant (water vapor) to the adsorbent layer (adsorbent filled layer) of the adsorption core 120.

In this way, the case main body 131 is sealed with the sheets 132 and 133 to enable keeping the inside of the case main body under vacuum. With this arrangement, no gas other than the refrigerant as a medium to be adsorbed exists in an internal sealed space formed by the case main body 131 and the sheets 132 and 133.

In the adsorption phase, the refrigerant is distributed from the evaporator side into the refrigerant passages 125 through the refrigerant inflow pipe 136. The refrigerant distributed into the refrigerant passages 125 penetrates into the adsorbent layer. In the desorption phase, the refrigerant is discharged from the adsorbent layer, and the discharged refrigerant is then guided through the respective refrigerant passages 125 from the refrigerant outflow pipe 137 into the condenser side.

The sheets 132 and 133 are provided with through holes 132a and 133a through which the heat-medium pipe 121 passes through. The heat-medium pipes 121 are hermetically sealed and fixed to the through holes 132a and 133a by bonding, such as brazing.

The tanks 134 and 135 are provided with a heat-medium inflow pipe 138 and a heat-medium outflow pipe 139, respectively, that can guide the heat medium. The heat medium flows into the heat-medium inflow pipe 138 of the lower tank 134 and then flows out of the heat-medium outflow pipe 139 of the upper tank 135 through the heat-medium pipes 121. Such lower tank 134 and upper tank 135 are to supply and distribute the heat-exchanged medium to the plurality of heat-medium pipes 121.

The adsorbers 11 and 12 that include the heat-transfer member 123 made of metal powder, like the present embodiment, can also obtain the same effects as those of the first embodiment described above.

Other Embodiments

The present disclosure is not limited to the above-mentioned embodiments, and various modifications and changes can be made to these embodiments without departing from the scope and spirit of the present disclosure as described below.

(1) In the above-mentioned embodiments, the heat-medium pipe 121 and the heat-transfer member 123 are made of copper or a copper alloy by way of example. However, the present disclosure is not limited thereto. The heat-medium pipe and the heat-transfer member may be made of other metals, such as stainless steel and aluminum.

(2) In the above-mentioned embodiments, the adsorption operating time is equal to the desorption operating time in each of the adsorbers 11 and 12 by way of example. However, the present disclosure is not limited thereto.

When the adsorption refrigerator performs the continuous cooling operation (the operation for cooling the air-conditioned air with the refrigeration capacity exhibited by the adsorbers 11 and 12) as well as the operation as a heat pump, the adsorption operating time is normally equal to the desorption operating time. However, the present disclosure may be applied to a case in which the adsorption operating time is different from the desorption operating time. In this case, the adsorption performance is limited by the adsorption operating time, and hence the adsorption operating time may be regarded as the switching time $\tau$.

(3) Although in the above-mentioned second embodiment, the heat-transfer member 123 is made of metal powder by way of example, the present disclosure is not limited thereto. The heat-transfer member 123 may be formed of at least one material selected from the group consisting of metal powder, a metal fiber, a metal mesh, and foamed metal.

(4) In the above-mentioned second embodiment, the cross section in the radius direction of each of the heat-medium pipe 121 and the case 30 is formed in a circular shape by way of example, but is not limited thereto. The cross-section in the radius direction of each of the heat-medium pipe and the case may be formed in any shape, such as an ellipse or rectangle.

What is claimed is:

1. A refrigerator, comprising:
a heat-medium pipe through which a heat medium flows;
an adsorbent layer including an adsorbent that adsorbs a vapor-phase refrigerant located outside the heat-medium pipe by being cooled by the heat medium and desorbs the adsorbed refrigerant by being heated; and
a heat-transfer member that transfers heat between the heat-medium pipe and the adsorbent, the heat-transfer member and the adsorbent being integrally formed, wherein
an adsorbent filling ratio is 70% or less when the adsorbent filling ratio is defined as a value obtained by dividing a filling density of the adsorbent filled in the adsorbent layer by a true density of particles of the adsorbent.

2. The refrigerator according to claim 1, wherein the heat-transfer member and the heat-medium pipe are metal-bonded together.

3. The refrigerator according to claim 1, wherein the heat-transfer member is made of at least one material selected from the group consisting of metal powder, a metal fiber, a metal mesh, and foamed metal.

4. The refrigerator according to claim 1, wherein the heat-transfer member is made of a plurality of plate members that are arranged at predetermined equal intervals, and
the plurality of plate members are arranged in a direction parallel to a flow direction of the heat medium in the heat-medium pipe.

5. The refrigerator according to claim 1, wherein the adsorbent is filled into fine pores of the heat-transfer member, and
the heat-transfer member and the adsorbent are integrally provided with an outer peripheral surface of the heat-medium pipe.

6. The refrigerator according to claim 1, wherein the adsorbent filling ratio is in a range from 15% to 70%.

7. The refrigerator according to claim 1, wherein the heat-transfer member is formed of a single material, and
the heat-transfer member intersects with the heat-medium pipe at right angle.

8. The refrigerator according to claim 7, wherein the adsorbent filling ratio is 15% or more.

9. The refrigerator according to claim 8, wherein the switching device is configured to cause the heat-medium pipe of the adsorber to be connected with a first circulation cycle to cause the adsorber to adsorb the refrigerant into the adsorbent and
the switching device is configured to cause the heat-medium pipe of the adsorber to be connected with a second circulation cycle to cause the adsorber to desorb the adsorbed refrigerant from the adsorbent.

10. An adsorption refrigerator comprising:
a plurality of adsorbers each of which include
a heat-medium pipe through which a heat medium flows,
an adsorbent layer including an adsorbent that adsorbs a vapor-phase refrigerant located outside the heat-medium pipe by being cooled by the heat medium and desorbs the adsorbed refrigerant by being heated, and
a heat-transfer member that transfers heat between the heat-medium pipe and the adsorbent, the heat-transfer member and the adsorbent being integrally formed; and
a switching device configured to operate between a plurality of operation modes by switching between the adsorber executing an adsorption operation to adsorb the refrigerant into the adsorbent and the adsorber executing a desorption operation to desorb the adsorbed refrigerant from the adsorbent, in the plurality of adsorbers, wherein
an adsorbent filling ratio is 70% or less when the adsorbent filling ratio is defined as a value obtained by dividing a filling density of the adsorbent filled in the adsorbent layer by a true density of particles of the adsorbent, and
the switching device is configured such that a switching time between the adsorption operation and the desorption operation is set in a range of not less than 20 seconds nor more than 240 seconds.

11. The adsorption refrigerator according to claim 10, wherein
the heat-transfer member and the heat-medium pipe are metal-bonded together.

12. The adsorption refrigerator according to claim 11, wherein
the heat-transfer member is formed of a single material, and
the heat-transfer member intersects with the heat-medium pipe at right angle.

13. The adsorption refrigerator according to claim 12, wherein
the adsorbent filling ratio is 15% or more.

14. The adsorber according to claim 13, wherein
the switching device is configured to cause the heat-medium pipe of the adsorber to be connected with a first circulation cycle to cause the adsorber to adsorb the refrigerant into the adsorbent or
the switching device is configured to cause the heat-medium pipe of the adsorber to be connected with a second circulation cycle to cause the adsorber to desorb the adsorbed refrigerant from the adsorbent.

15. An adsorption refrigerator comprising:
a plurality of adsorbers each of which include
a heat-medium pipe through which a heat medium flows,
an adsorbent layer including an adsorbent that adsorbs a vapor-phase refrigerant located outside the heat-medium pipe by being cooled by the heat medium and desorbs the adsorbed refrigerant by being heated, and
a heat-transfer member that transfers heat between the heat-medium pipe and the adsorbent, the heat-transfer member and the adsorbent being integrally formed; and
a switching valve configured to operate between a plurality of operation modes to change a circulation route of the refrigerant by switching between the adsorber executing an adsorption operation to adsorb the refrigerant into the adsorbent and the adsorber executing a desorption operation to desorb the adsorbed refrigerant from the adsorbent, in the plurality of adsorbers, wherein
an adsorbent filling ratio is 70% or less when the adsorbent filling ratio is defined as a value obtained by dividing a filling density of the adsorbent filled in the adsorbent layer by a true density of particles of the adsorbent, and the switching device is configured such that a switching time between the adsorption operation and the desorption operation is set in a range of not less than 20 seconds nor more than 240 seconds.

* * * * *